United States Patent [19]

Haynes

[11] 4,292,267
[45] Sep. 29, 1981

[54] METHOD FOR TERMINATING FLEXIBLE HELICAL WIRE CONDUIT

[75] Inventor: Charles E. Haynes, Adrian, Mich.

[73] Assignee: ACCO Industries Inc., Trumbull, Conn.

[21] Appl. No.: 69,761

[22] Filed: Aug. 27, 1979

Related U.S. Application Data

[60] Division of Ser. No. 956,975, Nov. 2, 1978, abandoned, which is a continuation of Ser. No. 761,215, Jan. 21, 1977, abandoned.

[51] Int. Cl.³ .................... B29C 6/04; B29C 17/14
[52] U.S. Cl. ................................ 264/157; 264/263; 264/275
[58] Field of Search ................ 264/157, 263, 275

[56] References Cited

U.S. PATENT DOCUMENTS

| | | | |
|---|---|---|---|
| 2,187,873 | 1/1940 | Bratz | 138/131 |
| 2,436,984 | 3/1948 | Wilson | 264/263 |
| 3,063,303 | 11/1962 | Cadwallader | 138/127 |
| 3,135,130 | 6/1964 | Bentley | 74/485 |
| 3,287,483 | 11/1966 | Morin | 264/263 |
| 3,301,931 | 1/1967 | Morin | 264/273 |
| 3,442,002 | 5/1969 | Geary, Jr. et al. | 264/298 |
| 3,671,622 | 6/1972 | Humphries | 264/263 |
| 3,865,666 | 2/1975 | Shoney | 264/271 |
| 3,884,814 | 5/1975 | Vogt et al. | 264/263 |
| 3,932,570 | 1/1976 | Cox et al. | 264/263 |

FOREIGN PATENT DOCUMENTS

| | | |
|---|---|---|
| 862782 | 3/1961 | United Kingdom . |
| 1007588 | 5/1967 | United Kingdom . |
| 1068485 | 5/1967 | United Kingdom . |
| 1178895 | 1/1970 | United Kingdom . |
| 1292435 | 10/1972 | United Kingdom . |

Primary Examiner—James B. Lowe
Attorney, Agent, or Firm—Pennie & Edmonds

[57] ABSTRACT

A continuous, flexible, helical wire conduit is terminated at predetermined cut-off points along its length by the steps of molding around the conduit adjacent said predetermined cut-off points, cylindrical termination members of thermoplastic material. The plastic members are molded onto the continuous conduit by injection molding at a sufficiently high pressure that the plastic penetrates into the recessed portions between adjacent helical coils, thereby assisting in sealing the interior of the conduit against corrosive liquid. In addition, the flexibility and length of the termination members are chosen to distribute vibration or bending stress along the termination members when the conduit is inserted into a fitting and thereby to reduce the concentration of stress at the conduit exit point. Conveniently, the termination member is provided with a reduced diameter at the predetermined cut-off point in order to minimize cut-off burrs.

3 Claims, 4 Drawing Figures

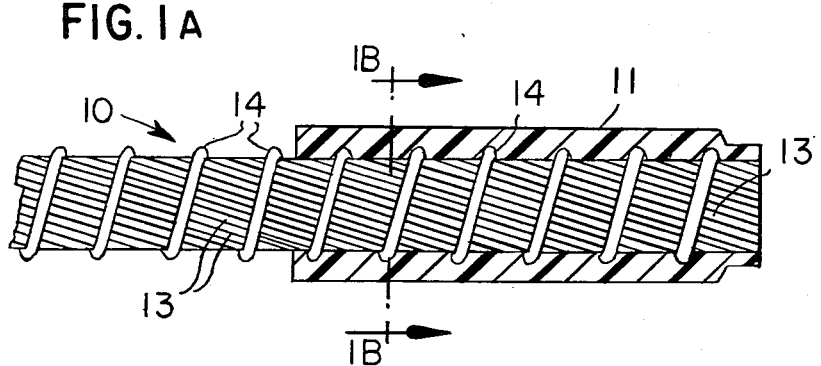
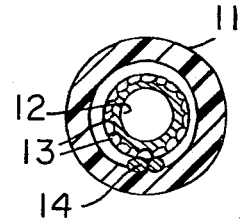
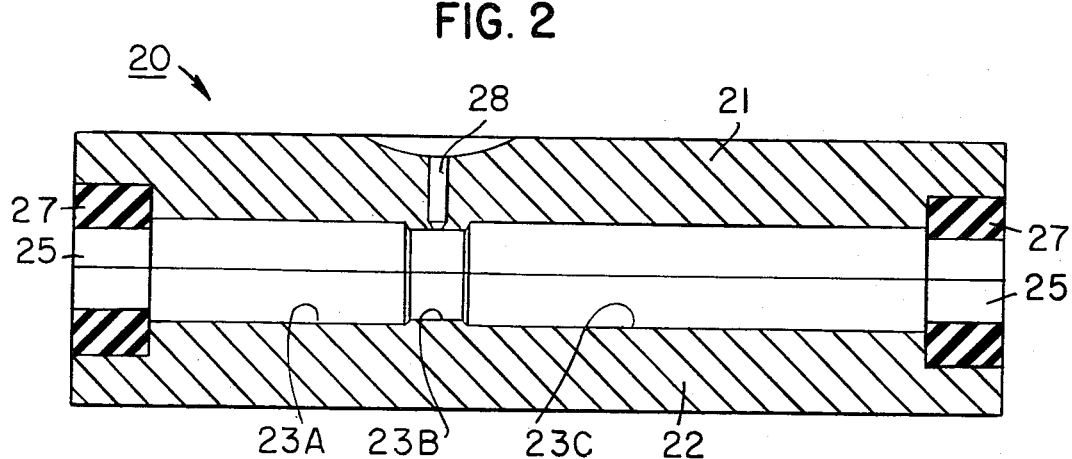
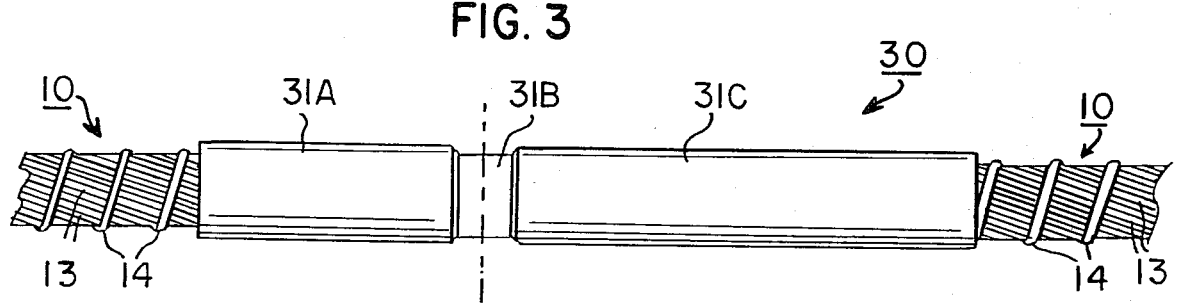

METHOD FOR TERMINATING FLEXIBLE HELICAL WIRE CONDUIT

This is a division, of application Ser. No. 956,975, filed Nov. 2, 1978 now abandoned which is in turn a continuation of Ser. No. 761,215 filed Jan. 21, 1977, now abandoned.

BACKGROUND OF THE INVENTION

This invention relates to a method for providing termination members to flexible helical wire conduit and the termination members formed thereby. More specifically, it relates to the provision of flexible plastic termination members by injection molding.

Flexible conduit, typically comprising a plurality of concentric wire helices, is useful in a wide variety of applications. Such conduit, for example, can be used in conjunction with a movable inner element to transmit tensile compressive forces to locations remote from an operator. Such cable conduit constructions are commonly used to actuate automotive parking brakes and clutches and are used in other industrial, marine and aircraft remote control applications.

Because such conduits are typically made in continuous form of wound wire strands, particular care must be taken in their termination. Specifically, when the continuous cable is cut into segments of useful length, means must be provided to prevent the severed wires, usually steel, from springing outward and uncoiling before they are permanently secured. Heretofore, such conduits were typically secured prior to cutting by wrapping them with metal ribbon grooves to fit over the outer helical wire. After wrapping, the ribbon was sometimes swaged onto the conduit in order to form a rigid sleeve. In some instances a metal bushing-type anchorage fitting was crimped onto this shaped metal wrapping.

The difficulty with this swaged ribbon or crimped fitting approach is two-fold. First, it failed to obtain a good seal between the ribbon and the table. Despite the swaging or crimping operations, numerous small passages exist in the interstices of the elements. Consequently, moisture or even salt water can pass through these passages, penetrate to the interior of the conduit and corrode or freeze critical portions. Second, the swaged metal ribbon is relatively inflexible as compared to the conduit, thereby defining a point of vibration stress concentration when the swaged ribbon termination is secured by an external fitting. Consequently, the conduit is subject to premature failure at this point when subject to prolonged vibration and flexing as from a jouncing axle.

SUMMARY OF THE INVENTION

In accordance with the present invention, continuous flexible helical wire conduit is terminated at predetermined cutoff points along its length by the steps of molding around the conduit adjacent said predetermined cut-off points, cylindrical termination members of thermoplastic material. The plastic members are molded onto the continuous conduit by injection molding at a sufficiently high pressure that the plastic penetrates into the recessed portions between adjacent helical coils, thereby assisting in sealing the interior of the conduit against corrosive liquid. In addition, the flexibility and length of the termination members are chosen to distribute vibration or bending stress along the termination member when the conduit is inserted into a fitting and thereby to reduce the concentration of stress at the conduit exit point. Conveniently, the termination member is provided with a reduced diameter at the predetermined cut-off point in order to minimize cut-off burrs.

BRIEF DESCRIPTION OF THE DRAWINGS

The advantages, nature and various additional features of the present invention will appear more fully upon consideration of the illustrative embodiments now to be described in detail in connection with the accompanying drawings in which:

FIG. 1A and 1B are side and end views, respectively, of the end portions of helical wire flexible conduit having a plastic terminating member molded onto the wire in accordance with the invention.

FIG. 2 is a schematic view of molding apparatus for molding the plastic terminating member of FIG. 1.

FIG. 3 is a view in side elevation and partially in section of the intermediate product formed by the molding apparatus of FIG. 2 prior to the cut-off step.

For convenience of reference, similar structural elements are designated by the same reference numeral throughout the drawing.

DETAILED DESCRIPTION

Referring to the drawings, FIGS. 1A and 1B show side and end views, respectively, of a helical wire flexible conduit 10 terminated by a molded cylindrical plastic termination member 11 in accordance with the invention. The conduit 10 typically comprises a plurality of concentric wire helices, such as an inner helix 12 of flat wire, an intermediate helix 13 of contiguous wires coiled with a relatively long pitch, and an outer helix 14 of widely spaced apart turns to retain the wires of the intermediate helix in position.

Molded plastic termination member 11 has a cylindrical outer surface and an internal surface which intimately conforms to the exposed surface of conduit 10. The plastic not only circumscribes the turns of widely spaced outer helix 14 but also penetrates into the small spaces between adjacent turns of intermediate helix 13. This latter intimate conformation provides this termination with enhanced resistance to water or other corrosive liquids. Conduit 10 is typically comprised of galvanized steel wire, plastic member 11 can be any flexible thermoplastic material such as nylon, acetal resin, or polyethylene.

The length of termination member 11 is chosen to exceed at least twice its diameter and so that the member will extend beyond by about one-fourth inch the edge of typical fittings into which the conduit is inserted. Such length distributes vibration stresses along the plastic covered portion of the conduit and thereby relieves the concentration of stresses at the exit edge.

FIG. 2 schematically illustrates molding apparatus for forming the cylindrical plastic terminating members of FIG. 1. Specifically, FIG. 2 illustrates a mold die 20 for injection molding of a pair of cylindrical plastic termination members onto a continuous length of helical wire flexible conduit. The die comprises two mating halves 21 and 22 defining one or more cylindrical cavities 23A, 23B, and 23C of a diameter larger than that of the flexible conduit. In the particular embodiment illustrated, cavities 23A and 23C each mold a cylindrical termination, and cavity 23B molds a restricted diameter cut-off section which minimizes excessive burr from abrasive cut-off. The dies also define a pair of open ends 24 and 25 for permitting passage of conduit through the mold, but each end contains a resilient sealing member 27 for sealing the end of the mold against the conduit. At least one of the halves 21 contains an aperture 28 for permitting injection of fluid thermoplastic material into the cavity of the mold. The dies of mold 20 are disposed in a commercially available injection molding machine (not shown) such as the "Jaco III" machine marketed by the Jaco Manufacturing Co., Berea, Ohio.

In operation of the apparatus to provide terminations to conduit 10, the mold is opened and the conduit is drawn through it to a predetermined cut-off position. The mold is then closed around the conduit with the resilient end members simultaneously sealing the ends and centering the conduit in the end regions. A conventional injection head (not shown) is inserted into aperture 28, and fluid plastic is injected into the mold cavity into intimate contact with the exposed surfaces of the outer and intermediate helices of conduit 10 and with the surfaces of cylindrical cavities 23A, 23B, and 23C. After the plastic cools from the fluid state, the mold is opened and the conduit with the molding is drawn from the mold to another work station where the conduit is cut apart.

As a specific example, a termination member can be molded of a nylon copolymer commercially available as Type 6 Nylon Co-Polymer (Product 8252-HS-1) from the Allied Chemical Company, New York, New York. This material is preferably molded at a temperature of 460°–500° F. and at a maximum pressure of about 215 pounds per square inch. Injection time is about three seconds, and cycle time is about ten seconds.

FIG. 3 illustrates the intermediate product formed by the molding operation comprising a portion of a continuous conduit 10 around which has been molded a thermoplastic structure 30 consisting of one or more cylindrical portions 31A, 31B, and 31C corresponding to the cylindrical cavities 23A, 23B, and 23C of mold die 20. This structure is conveniently cut apart at reduced diameter portion 31B using a cut-off wheel, leaving two conduit ends terminated by termination members 31A and 31C, as shown in FIG. 1.

In typical use of this conduit, the thus terminated end is subsequently inserted into a fitting, such as a screw machine or stamped bushing which is crimped down onto the plastic termination member. The crimping operation further enhances the liquid seal by forcefully biasing the resilient plastic material into intimate contact with the wires of intermediate helix 13.

While the invention has been described in connection with a small number of specific embodiments, it is to be understood that these embodiments are merely illustrative of many other specific embodiments which also utilize the principles of the invention. Thus, numerous and varied methods and devices using varied materials can be devised by those skilled in the art without departing from the spirit and scope of the present invention.

I claim:

1. The method of forming termination members on ends of helical wire conduits of the type comprising a helix of contiguous wires coiled with a relatively long pitch and an outer wire helix, comprising the steps of sequentially:
   (a) providing a continuous length of a wire conduit;
   (b) feeding the length of wire conduit axially of its length into a mold cavity until a secion thereof intermediate its ends is disposed within said cavity, said section having a predetermined cut-off point, intermediate thereof, defining the ends of two wire conduits;
   (c) injecting thermoplastic material into said mold cavity at sufficient pressure and temperature to mold said material along said section and the surfaces of the exposed wires thereof and fill the external spaces between adjacent helical wire turns, the molding of the material being along an axial length of the wire conduit section being sufficient to form the termination member for one end of the conduit on one axial side of said cut-off point and the termination member of one end of a second conduit on the other axial side of said cut-off point;
   (d) removing the molded section from said mold cavity;
   (e) repeating the molding operation of steps (b), (c) and (d) at successive spaced sections along said wire conduit; and,
   (f) cutting the wire conduit at said predetermined cut-off points into separate wire conduits.

2. The method according to claim 1 wherein:
   (a) the thermoplastic material is molded in the area immediately on both sides of said cut-off point to a diameter less than the diameter to which it is molded along the rest of the termination member.

3. The method according to claim 1 wherein:
   (a) the molding of the two termination members at one section is to the same shape as the molding of the two termination members at the adjacent section so as to provide the separate wire conduits with termination members of identical shape at their opposite ends.

* * * * *

UNITED STATES PATENT AND TRADEMARK OFFICE
CERTIFICATE OF CORRECTION

PATENT NO. : 4,292,267
DATED : September 29, 1981
INVENTOR(S) : CHARLES E. HAYNES It is certified that error appears in the above-identified patent and that said Letters Patent are hereby corrected as shown below:

Title page, item 60, after November 2, 1978 delete ", abandoned,"

Page 1, Col. 1, line 6, after November 2, 1978 delete "now abandoned".

Signed and Sealed this

Twenty-ninth Day of December 1981

[SEAL]

Attest:

GERALD J. MOSSINGHOFF

Attesting Officer    Commissioner of Patents and Trademarks